(12) United States Patent
Jeon et al.

(10) Patent No.: US 6,859,010 B2
(45) Date of Patent: Feb. 22, 2005

(54) AUTOMATIC CHARGING SYSTEM AND METHOD OF ROBOT CLEANER

(75) Inventors: Hyeong-Shin Jeon, Gyeonggi-Do (KR); Chun-Kyu Woo, Incheon (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 10/600,769

(22) Filed: Jun. 23, 2003

(65) Prior Publication Data

US 2004/0178767 A1 Sep. 16, 2004

(30) Foreign Application Priority Data

Mar. 14, 2003 (KR) .............................. 10-2003-0016174

(51) Int. Cl.⁷ ........................ H01M 10/44; H01M 10/46
(52) U.S. Cl. .................................................... 320/109
(58) Field of Search ............................... 320/107, 109, 320/114, 115; 700/245, 255; 318/568.12, 580, 587

(56) References Cited

U.S. PATENT DOCUMENTS

| 5,440,216 A | * | 8/1995 | Kim ........................... 318/587 |
| 5,534,762 A | * | 7/1996 | Kim ....................... 318/568.12 |
| 6,459,955 B1 | * | 10/2002 | Bartsch et al. .............. 700/245 |
| 6,586,908 B2 | * | 7/2003 | Petersson et al. ........... 320/107 |

* cited by examiner

*Primary Examiner*—Edward H. Tso
(74) *Attorney, Agent, or Firm*—Greenblum & Bernstein, P.L.C.

(57) ABSTRACT

An automatic charging system of a robot cleaner includes: a rotating plate installed at a robot cleaner; an infrared ray receiving unit mounted at the rotating plate and receiving an infrared signal generated from a power supply unit while being rotated; a microcomputer for moving the robot cleaner to the power supply unit on the basis of the received infrared signal; and an ultrasonic generator for generating a stop signal when the robot cleaner nears to the power supply unit. A robot cleaner can be accurately and quickly moved to a power supply unit for a rapid charging operation, and a cost for implementing the robot cleaner can be reduced.

16 Claims, 4 Drawing Sheets

FIG. 3
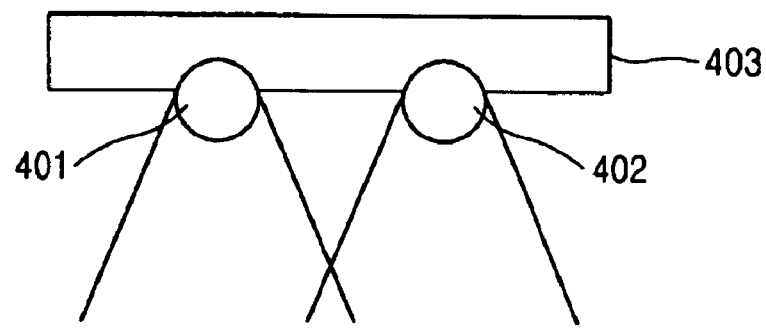
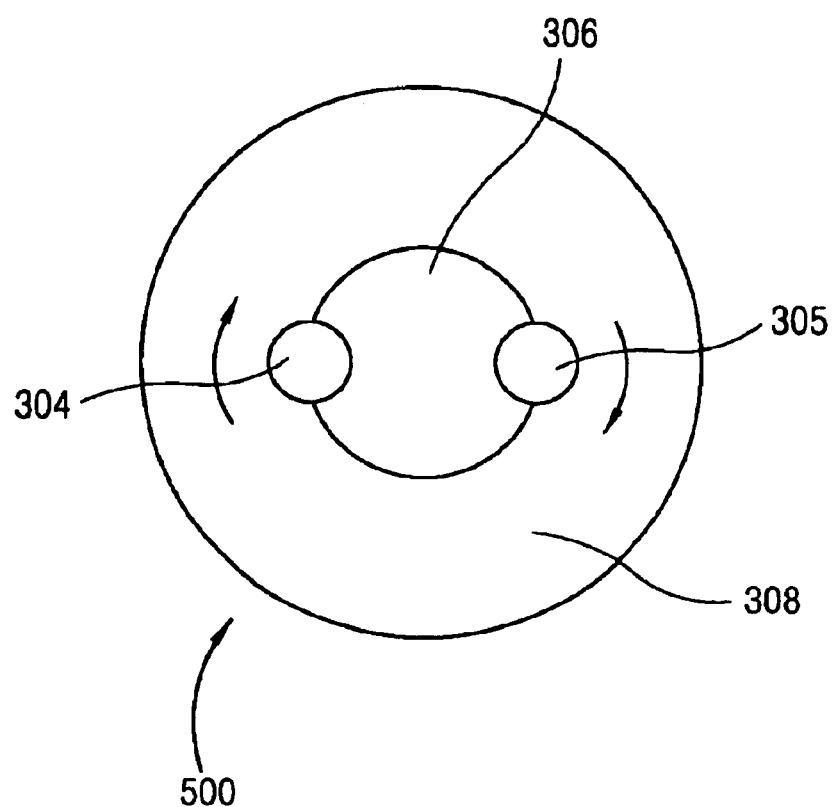

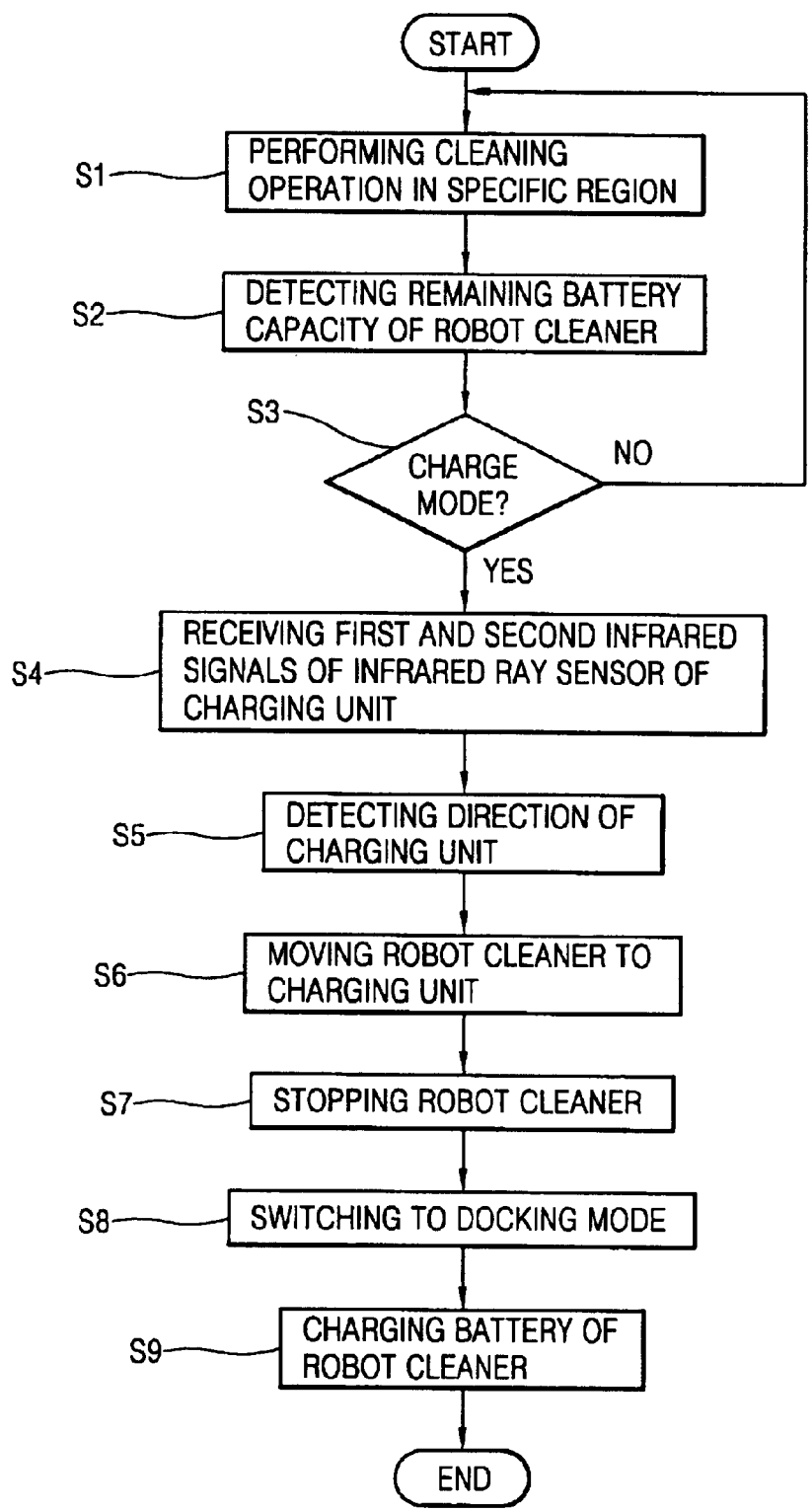

AUTOMATIC CHARGING SYSTEM AND METHOD OF ROBOT CLEANER

BACKGROUND OF THE INVENTION

1. Field of the Invention

The present invention relates to a robot cleaner and, more particularly, to an automatic charging system and method of a robot cleaner.

2. Description of the Background Art

FIG. 1 is a schematic block diagram showing a construction of a charging system of a robot cleaner in accordance with a conventional art.

As shown in FIG. 1, a charging system of a robot cleaner (not shown) consists of a power receiving unit 100 of a robot cleaner and a power supply unit 200 for charging a battery 101 of the robot cleaner.

The power supply unit 200 includes an infrared ray sensor 201 for communicating with the robot cleaner and a charging unit 202 for charging the battery 101 of the robot cleaner. The infrared ray sensor 201 is installed at the charging unit 202 and generates an infrared signal in a predetermined direction.

The power receiving unit 100 of the robot cleaner includes: a battery 101; a remaining battery capacity detector 102 for detecting a remaining capacity of the battery 101 installed in the robot cleaner; a infrared ray sensor 103 fixedly installed in the robot cleaner and communicating with the power supply unit 200; and a microcomputer 104 for moving the robot cleaner along a pre-set path through a mapping algorithm in order to receive an infrared signal outputted from the infrared ray sensor 201 of the power supply unit 200 if the detected remaining battery capacity is below a reference value, and moving the robot cleaner to the charging unit 202 on the basis of an infrared ray signal upon receipt of it.

The infrared ray sensor 103 is fixedly installed at the robot cleaner in order to detect the infrared signal of the infrared ray sensor 201 of the charging unit 202.

The infrared ray sensor 103 of the robot cleaner outputs to the power supply unit 200 a start signal for transmitting a data informing that a communication protocol starts for charging to the charging unit 200, a coupler signal for informing that a charge switching unit (not shown) of the robot cleaner is turned on; a complete signal informing that the communication protocol for charging is terminated, and an end signal for informing that charging is ended when an error is generated in the robot cleaner, according to a control signal of the microcomputer 104.

The infrared ray sensor 201 of the power supply unit 200 outputs to the power receiving unit 100 a connection request signal for informing that the charging unit 202 is available for charging, a charge signal for indicating that charging is started, and a fault signal for informing the robot cleaner that there is an error in the charging unit 202, according to a control signal of the charging unit 202.

The operation of the charging system of the robot cleaner will now be described with reference to FIG. 1.

First, when the robot cleaner is in a charging mode, the microcomputer 104 of the robot cleaner moves the robot cleaner along a pre-set path through a mapping algorithm in order to receive an infrared signal.

When the infrared ray sensor 103 of the robot cleaner receives an infrared signal generated from the infrared ray sensor 201 of the power supply unit 200 while the robot cleaner is moved along the pre-set path, the infrared ray sensor 103 outputs the received infrared signal to the microcomputer 104.

Then, the microcomputer 104 moves the robot cleaner to a position of the charging unit 202 on the basis of the infrared signal, generates a start signal through the infrared ray sensor 103, and transmits the generated start signal to the infrared ray sensor 201. Then, the infrared ray sensor 201 of the power supply unit 200 detects the start signal and transmits the connection request signal to the infrared ray sensor 103 of the robot cleaner.

Thereafter, when the microcomputer 104 detects the connection request signal through the infrared ray sensor 103 of the robot cleaner, a power terminal (not shown) of the robot cleaner is electrically connected to a charge terminal (that is, charge plate, not shown) installed at the charging unit 202 according to a control signal of the microcomputer 104.

When the power terminal and the charge terminal are connected to each other (available for charging), the microcomputer 104 transmits the coupler signal to the infrared ray sensor 201 of the charging unit 200 through the infrared ray sensor 103 of the robot cleaner. Then, the charging unit 202 receives the coupler signal through the infrared ray sensor 201, generates the charge signal, and charges the battery 101.

Thereafter, when the battery is completely charged, the microcomputer 104 transmits the complete signal to the infrared ray sensor 201 of the charging unit 202, and upon receipt of the complete signal, the charging unit 202 cuts off the charge signal. As the charge signal is cut off, the coupler signal of the robot cleaner is not generated any longer.

Meanwhile, if the end signal is generated from the robot cleaner or if the fault signal is generated from the charging unit 202 while the battery 101 is being charged, the connection request signal is cut off and the battery charging operation is ended after a certain time lapse.

However, the charging system of the robot cleaner in accordance with the conventional art has the following problems.

That is, in order to receive the infrared signal generated from the infrared ray sensor installed at the charging unit 202, the robot cleaner itself is moved along the pre-set path, so that the robot cleaner fails to quickly move to the charging unit (that is, the charge terminal of the charging unit). In other words, because the robot cleaner is moved along the pre-set path to detect the infrared signal, it can not detect the infrared signal quickly.

In addition, in order to detect the infrared signal quickly, a plurality of infrared ray sensors are fixedly installed at the robot cleaner. Thus, fixedly installation of the plural infrared ray sensors at the robot cleaner to receive the infrared signal outputted from the charging unit within a short time causes an increase in a cost for implementing the charging system of the robot cleaner.

SUMMARY OF THE INVENTION

Therefore, an object of the present invention is to provide an automatic charging system and method of a robot cleaner in which a few infrared ray sensors are installed at the robot cleaner and rotated to sense an infrared signal to thereby accurately and quickly move a robot cleaner to a charging unit.

Another object of the present invention is to provide an automatic charging system and method of a robot cleaner in which a few infrared ray sensors are installed at a robot cleaner and rotated to sense an infrared signal to thereby accurately and quickly connect a robot cleaner to a charge terminal.

Still another object of the present invention is to provide an automatic charging system and method of a robot cleaner in which a few infrared ray sensors are installed at a robot cleaner and rotated to sense an infrared signal to thereby reduce a cost for implementing a robot cleaner.

To achieve these and other advantages and in accordance with the purpose of the present invention, as embodied and broadly described herein, there is provided an automatic charging system of a robot cleaner including: a rotating plate installed at a robot cleaner; an infrared ray receiving unit mounted at the rotating plate and receiving an infrared signal generated from a power supply unit while being rotated; a microcomputer for moving the robot cleaner to the power supply unit on the basis of the received infrared signal; and an ultrasonic generator for generating a stop signal when the robot cleaner nears to the power supply unit.

The microcomputer stops movement of the robot cleaner on the basis of the stop signal, and the robot cleaner receives power from the power supply unit according to a control signal from the microcomputer.

To achieve the above objects, there is also provided an automatic charging system of a robot cleaner including: a power supply unit having a charging unit for supplying power and an infrared ray generator for positioned at the charging unit and generating an infrared signal; and a power receiving unit having a rotating plate installed at the robot cleaner, an infrared ray receiving unit mounted at the rotating plate and receiving the infrared signal while being rotated, a microcomputer for moving a robot cleaner to the charging unit on the basis of the received infrared signal, and an ultrasonic generator for generating a stop signal when the robot cleaner nears to the charging unit.

The microcomputer stops movement of the robot cleaner on the basis of the stop signal, and the robot cleaner receives power from the charging unit according to a control signal from the microcomputer.

To achieve the above objects, there is also provided an automatic charging system of a robot cleaner including: a power supply unit having a charging unit fixedly installed to charge a battery and an infrared ray generator positioned at the charging unit and generating an infrared signal; and a power receiving unit having a battery installed at the robot cleaner and charged by the charging unit, a remaining battery capacity detecting unit for detecting a remaining battery capacity; a rotating plate mounted at a main body of the robot cleaner, an infrared ray receiving unit mounted at the rotating plate and rotating to receive the infrared signal if the detected remaining battery capacity is below a reference value, a microcomputer for moving the robot cleaner to the charging unit along the direction that the infrared signal is generated, and an ultrasonic generator for generating a stop signal when the robot cleaner nears to the charging unit.

The microcomputer stops movement of the robot cleaner on the basis of the stop signal and charges the battery.

To achieve the above objects, there is also provided an automatic charging method of a robot cleaner including: rotating an infrared ray receiving unit of a rotating plate mounted at a main body of a robot cleaner when the robot cleaner is in a charge mode; receiving an infrared signal generated from a power supply unit and detecting a direction of the power supply unit on the basis of the infrared signal received through an infrared ray receiving unit; moving the robot cleaner along the detected direction; generating a stop signal when the robot cleaner nears to the power supply unit; stopping movement of the robot cleaner on the basis of the stop signal; and docking a power terminal of the robot cleaner and a charge terminal of the power supply unit when the robot cleaner is stopped.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a detailed view showing infrared sensors of the automatic charging system of a robot cleaner of FIG. 2; and FIG. 4 is a flow chart of an automatic charging method of a robot cleaner in accordance with the present invention.

DETAILED DESCRIPTION OF THE PREFERRED EMBODIMENTS

Reference will now be made in detail to the preferred embodiments of the present invention, examples of which are illustrated in the accompanying drawings.

An automatic charging system and method of a robot cleaner of the present invention is featured in that a few infrared ray sensors are installed at a robot cleaner and rotated to accurately and quickly detect an infrared signal received from a fixedly installed charging unit, so that the robot cleaner can be accurately and quickly moved to the charging unit, a power terminal of the robot cleaner can be accurately and quickly connected to a charge terminal of the charging unit, and a cost for implementing the robot cleaner can be reduced.

A preferred embodiment of the present invention will now be described with reference to FIGS. 2 to 4.

The automatic charging system and method of a robot cleaner of the present invention may be installed at a toy or any device which is movable by using a battery.

Figure 1:
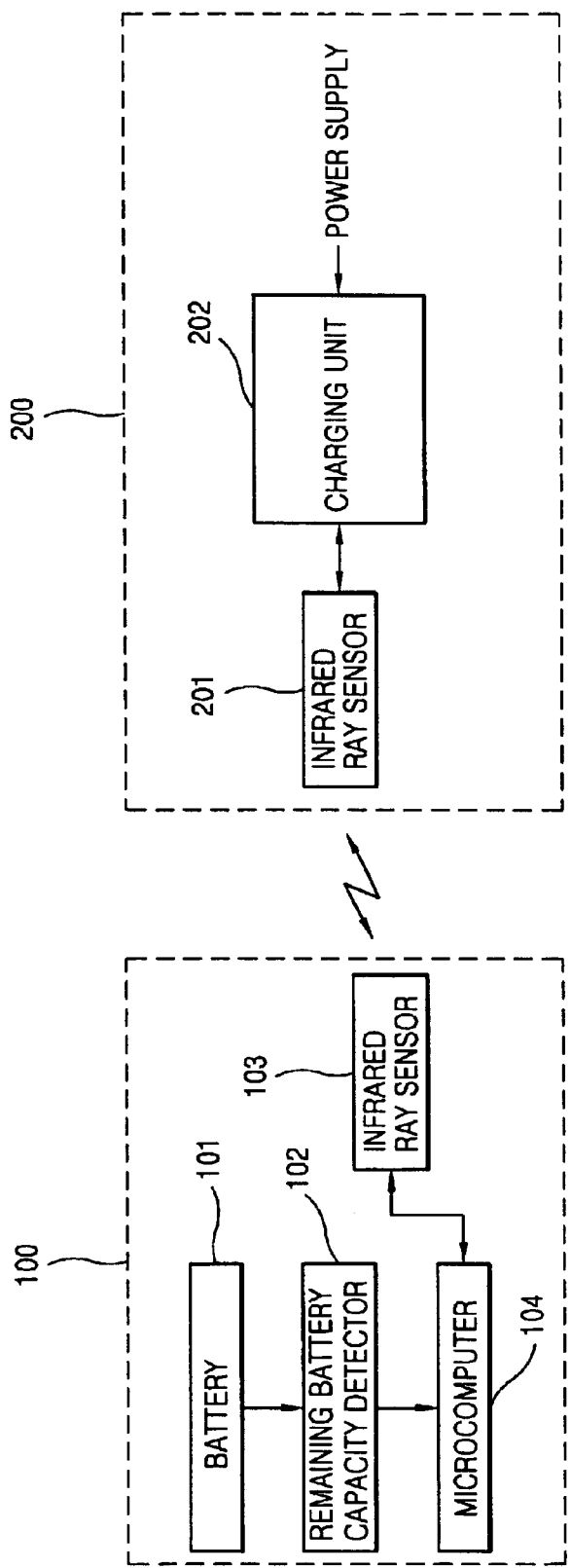
FIG. 1 is a schematic block diagram showing a construction of a charging system of a robot cleaner in accordance with a conventional art.
Figure 2:
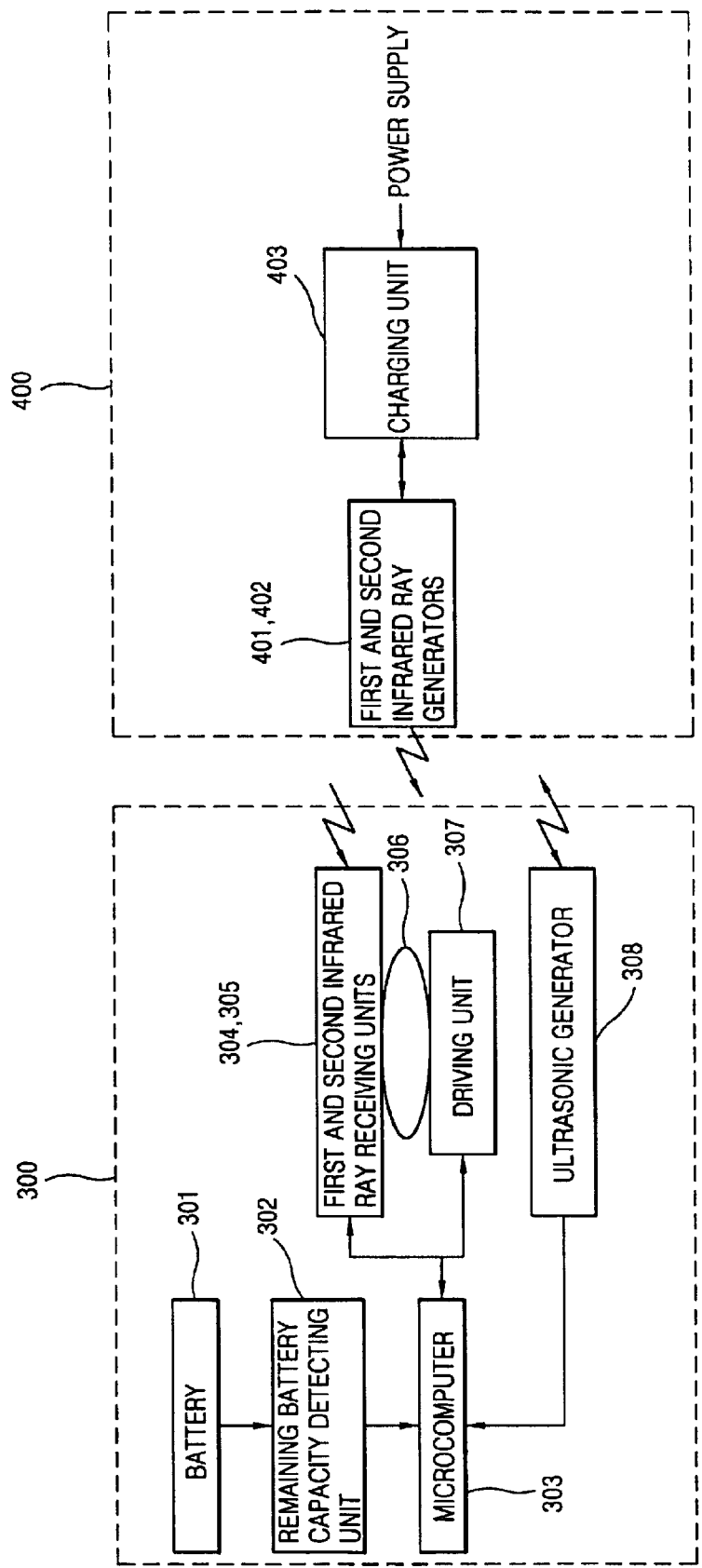
FIG. 2 is a schematic block diagram showing the construction of an automatic charging system of a robot cleaner in accordance with the present invention.

FIG. 2 is a schematic block diagram showing the construction of an automatic charging system of a robot cleaner in accordance with the present invention.

As shown in FIG. 2, the automatic charging system of a robot cleaner in accordance with the present invention includes: a power receiving unit 300 installed at a robot cleaner and a power supply unit 400 for inducing the robot cleaner and charging a battery mounted in the robot cleaner.

The power supply unit 400 includes a charging unit 403 for charging the battery 301 of the robot cleaner; and first and second infrared ray generators 401 and 402 positioned at left and right sides of a charge terminal of the charging unit 403 and outputting first and second infrared signals at a certain angle (e.g., 120°) to guide the robot cleaner (reference numeral 500 of FIG. 3) to the charging unit 403.

The power receiving unit 300 of the robot cleaner includes: a battery 301; a remaining battery capacity detecting unit 302 for detecting a remaining capacity of the battery 301 installed at the robot cleaner; a rotating plate 306 mounted at a main body (308 of FIG. 3) of the robot cleaner; first and second infrared ray sensors 304 and 305 mounted at the rotating plate 306 and receiving the first and second infrared signals outputted from the first and second infrared ray sensors 401 and 402; a microcomputer 303 for moving the robot cleaner along a direction that the first and second infrared signals are generated; and an ultrasonic generator 308 for generating a stop signal when the robot cleaner nears to the charging unit 403.

The microcomputer 303 stops the robot cleaner on the basis of the stop signal, and the robot cleaner stopped in front of the charging unit 403 is connected to a charge terminal of the charging unit 403 and performs a battery charging operation according to a control signal of the microcomputer 303.

FIG. 3 is a detailed view showing infrared sensors of the automatic charging system of a robot cleaner of FIG. 2.

As shown in FIG. 3, of the power supply unit 400, the first infrared ray generator 401 is installed at the left side of the charge terminal (not shown) of the charging unit 403, while the second infrared ray generator 402 is installed at the right side of the charge terminal of the charging unit 403.

Of the power receiving unit 300 of the robot cleaner, the first infrared ray receiving unit 304 is installed at the rotating plate 306 mounted at the main body 308 of the robot cleaner while the second infrared ray receiving unit 305 is installed at the opposite direction of the first infrared ray receiving unit 304. Reference numeral 500 denotes the robot cleaner, and 308 denotes a main body of the robot cleaner.

The operation of the automatic charging system of the robot cleaner in accordance with the present invention will now be described in detail with reference to FIGS. 2 to 4.

FIG. 4 is a flow chart of an automatic charging method of a robot cleaner in accordance with the present invention.

As shown in FIG. 4, the automatic charging method of a robot cleaner in accordance with the present invention includes: performing a cleaning operation by the robot cleaner as selected by a user in a specific region while moving the robot cleaner (step S1) and detecting a remaining battery capacity of the robot cleaner (step S2); judging whether the robot cleaner is in a charge mode if the detected remaining battery capacity is below a reference value or if the cleaning operation is terminated by the user (step S3); rotating the first and second infrared ray receiving units 304 and 305 mounted at the rotating plate 306 of the robot cleaner and receiving first and second infrared signals generated at a predetermined angle from the first and second infrared ray generators 401 and 402 of the power supply unit 400, if the cleaning operation is terminated or if the robot cleaner is in the charge mode for charging the battery 301 (step S4); detecting a direction of the charging unit 403 on the basis of the received first and second infrared signals (step S5); stopping movement of the robot cleaner if a stop signal is inputted from the ultrasonic generator 308 (step S7) while the robot cleaner is being moved to the charging unit 503 on the basis of the detected direction (step S6); and switching the mode of the robot cleaner to a docking mode (step S8) when the robot cleaner is stopped, and docking the power terminal of the robot cleaner to the charge terminal of the charging unit 403 to charge the battery 101 (step S9).

First, the robot cleaner 500 performs a cleaning operation according to a user's command in a specific region (step S1).

The cleaning operation is based on a general technique, descriptions of which are thus omitted.

The remaining battery capacity detecting unit 302 of the robot cleaner checks a remaining capacity of the battery 301 installed in the robot cleaner, and outputs a value corresponding to the checked remaining battery capacity to the microcomputer 303 (step S2).

If the checked remaining battery capacity is below a reference value, the microcomputer 303 switches the mode of the robot cleaner to a charge mode in order to charge the battery 301. The charge mode in this connection is a mode in which the robot cleaner returns to the charging unit 403 to charge the battery 301 if the checked remaining battery capacity is below the reference value.

When the cleaning operation is terminated according to a user's command, the microcomputer 303 switches the mode of the robot cleaner to the charge mode (step S3).

When the robot cleaner is in the charge mode, the microcomputer 303 of the power receiving unit 300 generates a drive signal and outputs it to the driving unit 307. Then, the driving unit 307 rotates the rotating plate 306 on the basis of the drive signal. As the rotating plate 306 is rotated, the first and second infrared ray receiving units 304 and 305 mounted at the rotating plate 306 are rotated accordingly.

While being rotated by the rotating plate 306, the first and second infrared ray receiving units 304 and 305 of the robot cleaner receive first and second infrared signals respectively outputted from the first and second infrared ray generators 401 and 402.

At this time, if one infrared ray receiving unit (infrared ray sensor) of the power receiving unit 300 of the robot cleaner is mounted at the rotating plate 306, the infrared ray sensor receives the first and second infrared signals outputted from the first and second infrared ray generators 401 and 402 while being rotated by 360°.

If two infrared ray sensors are installed at the rotating plate 306, they receive first and second infrared signals outputted from the first and second infrared ray generators 401 and 402 while being rotated by 180°, respectively.

If three infrared ray sensors are mounted at the rotating plate 306, they receive the first and second infrared signals outputted from the first and second infrared ray generators 401 and 402 while being rotated by 120°, respectively.

If four infrared ray sensors are mounted at the rotating plate 306, they receive the first and second infrared signals outputted from the first and second infrared ray generators 401 and 402 while being rotated by 90°, respectively.

Thereafter, the microcomputer 303 of the robot cleaner detects a direction of the charging unit 403 on the basis of the first and second infrared signals received from the first and second infrared ray generators 401 and 402, and moves the robot cleaner in the detected direction. That is, the robot cleaner is moved in the direction that the first and second infrared ray signals are generated.

In detail, the first infrared ray receiving unit 304 of the power receiving unit 300 detects the first infrared ray signal while being rotated, and the second infrared ray receiving unit 305 of the power receiving unit 300 detects the second infrared ray signal while being rotated.

At this time, the microcomputer 303 moves the robot cleaner 500 along the center between the detected direction in which the first infrared signal is generated and the detected direction in which the second infrared signal is generated.

As the robot cleaner 500 keeps moving to the direction that the first and second infrared signals are generated, it eventually reaches the charging unit 403. Then, the power receiving unit 300 of the robot cleaner 500 and the charging unit 403 face each other, and at this time, the robot cleaner 500 is close to the charging unit 403.

As the robot cleaner approaches the charging unit 403, the ultrasonic generator 308 generates a stop signal and outputs it to the microcomputer 303. The ultrasonic generator 308 usually measures a distance, so that when the robot cleaner comes close to the charging unit 403, it outputs the stop signal to the microcomputer 303.

While the microcomputer 303 moves the robot cleaner to the charging unit 403 along the received direction of the infrared signal, when it receives the stop signal from the ultrasonic generator 308, the microcomputer 303 stops movement of the robot cleaner.

In addition, when the robot cleaner is stopped, the microcomputer 303 switches the mode of the robot cleaner to a docking mode. The docking mode in this connection is a mode for connecting the power terminal of the robot cleaner and the charge terminal of the charging unit 402 in order to charge the battery 301 of the robot cleaner.

In the docking mode, the robot cleaner cokes the power terminal of the robot cleaner to the charge terminal of the charging unit 403. That is, moved at the charging unit 403, the robot cleaner is connected to the charge terminal of the charging unit 403 and performs a battery charging operation according to a control signal from the microcomputer 303.

When power is supplied from the charging unit 403 to the battery 301 as the power terminal of the robot cleaner and the charge terminal of the charging unit 403 are connected to each other, the remaining battery capacity detecting unit 302 outputs a docking complete signal to the microcomputer 303.

If, however, the power terminal of the robot cleaner and the charge terminal of the charging unit 403 are not connected to each other and thus no power is supplied from the charging unit 403 to the battery 301, the remaining battery capacity detector 302 outputs a docking error signal to the microcomputer 303.

Then, the microcomputer 303 controls the robot cleaner so that the power terminal of the robot cleaner can be docked again to the charge terminal of the charging unit 403 on the basis of the docking error signal.

In the meantime, the robot cleaner can be also moved to the charging unit 403 by installing one infrared ray generator at the charging unit 403 and one infrared ray receiving unit at the rotating plate 306.

In this case, for example, one infrared ray receiving unit installed at the rotating plate 306 receives an infrared signal generated from one infrared ray generator installed at the charging unit 403 while being rotated, and outputs the received infrared signal to the microcomputer 303. then, the microcomputer 303 moves the robot cleaner 500 along the direction in which the infrared signal si generated.

Accordingly, in the present invention, by mounting one or more infrared receiving units at the rotating plate 306 mounted at the main body of the robot cleaner and rotated, the infrared signal generated from one or more infrared ray generators positioned at a certain angle at the charging unit 403 can be accurately and quickly received.

In addition, in the present invention, by accurately and quickly detecting the direction of the charging unit 403, the power terminal of the robot cleaner can be accurately and quickly connected (docked) to the charge terminal of the charging unit 403.

As so far described, the automatic charging system and method of a robot cleaner of the present invention have many advantages.

That is, for example, because a few infrared ray receiving units (infrared ray sensor) are installed at the robot cleaner and rotated to quickly and accurately receive the infrared signal generated from the power supply unit, so that the robot cleaner can be accurately and quickly moved to the charging unit.

For example, in the present invention, the infrared ray sensor for generating an infrared signal is installed at the charge terminal of the charging unit, the rotating plate is installed at the main body of the robot cleaner, and the infrared ray sensor is installed at the rotating plate and rotated to quickly and accurately detect infrared signals generated from the infrared sensors of the power supply unit, so that the robot cleaner can be accurately and quickly moved to the charging unit.

Second, a few infrared ray receiving units are installed at the robot cleaner and then the infrared ray receiving unit is rotated to quickly and accurately receive the infrared signal generated from the power supply unit, so that the robot cleaner can be accurately and quickly connected to the charge terminal.

Third, by installing a few infrared ray receiving units at the robot cleaner, a cost for implementing the robot cleaner can be reduced. For example, the charging system of a robot cleaner of the present invention uses one or two or more infrared ray sensors, rather than using a plurality of infrared ray sensors. Accordingly, a cost for implementing the robot cleaner can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An automatic charging system of a robot cleaner comprising:
   a rotating plate installed at a robot cleaner;
   an infrared ray receiving unit mounted at the rotating plate and receiving an infrared signal generated from a power supply unit while being rotated;
   a microcomputer for moving the robot cleaner to the power supply unit on the basis of the received infrared signal; and
   an ultrasonic generator for generating a stop signal when the robot cleaner nears to the power supply unit,
   wherein the microcomputer stops movement of the robot cleaner on the basis of the stop signal, and the robot cleaner receives power from the power supply unit according to a control signal from the microcomputer.

2. The system of claim 1, wherein the power supply unit comprises:
   a charging unit fixedly installed at a specific region and charging a battery of the robot cleaner; and
   an infrared ray generator positioned at the charging unit and generating an infrared signal.

3. The system of claim 1, wherein the microcomputer moves the robot cleaner along the direction in which the infrared signal is generated.

4. The system of claim 1 further comprising:
a remaining battery capacity detector for detecting a remaining capacity of the battery of the robot cleaner, and the infrared ray receiving unit is rotated to receive the infrared signal according to a control signal of the microcomputer if the detected remaining capacity of the battery is below a reference value or when a specific operation of the robot cleaner is terminated.

5. The system of claim 1, wherein the rotation angle of the infrared ray receiving unit is varied according to the number of infrared ray receiving units installed at the rotating plate.

6. An automatic charging system of a robot cleaner comprising:
a power supply unit having a charging unit for supplying power and an infrared ray generator for positioned at the charging unit and generating an infrared signal; and
a power receiving unit having a rotating plate installed at the robot cleaner, an infrared ray receiving unit mounted at the rotating plate and receiving the infrared signal while being rotated, a microcomputer for moving a robot cleaner to the charging unit on the basis of the received infrared signal, and an ultrasonic generator for generating a stop signal when the robot cleaner nears to the charging unit,
wherein the microcomputer stops movement of the robot cleaner on the basis of the stop signal, and the robot cleaner receives power from the charging unit according to a control signal from the microcomputer.

7. The system of claim 6, wherein the infrared ray receiving unit is installed at the rotating plate mounted at a main body of the robot cleaner.

8. The system of claim 6, wherein the robot cleaner charges a battery installed therein by receiving power from the charging unit according to a control signal of the microcomputer.

9. The system of claim 6, wherein the microcomputer moves the robot cleaner along the direction in which the infrared signal is generated.

10. The system of claim 6 further comprising:
a remaining battery capacity detector for detecting a remaining capacity of the battery of the robot cleaner, and the infrared ray receiving unit is rotated to receive the infrared signal according to a control signal of the microcomputer if the detected remaining capacity of the battery is below a reference value or when a cleaning operation of the robot cleaner is terminated.

11. The system of claim 6, wherein the rotation angle of the infrared ray receiving unit is varied according to the number of infrared ray receiving units installed at the rotating plate.

12. An automatic charging system of a robot cleaner comprising:

a power supply unit having a charging unit fixedly installed to charge a battery and an infrared ray generator positioned at the charging unit and generating an infrared signal; and
a power receiving unit having a battery installed at the robot cleaner and charged by the charging unit, a remaining battery capacity detecting unit for detecting a remaining battery capacity, a rotating plate mounted at a main body of the robot cleaner, an infrared ray receiving unit mounted at the rotating plate and rotating to receive the infrared signal if the detected remaining battery capacity is below a reference value, a microcomputer for moving the robot cleaner to the charging unit along the direction that the infrared signal is generated, and an ultrasonic generator for generating a stop signal when the robot cleaner nears to the charging unit,
wherein the microcomputer stops movement of the robot cleaner on the basis of the stop signal and charges the battery.

13. The system of claim 12, wherein the rotation angle of the infrared ray receiving unit is varied according to the number of infrared ray receiving units installed at the rotating plate.

14. An automatic charging method of a robot cleaner in which an infrared signal is generated to induce a robot cleaner to a power supply unit for supplying power to charge the robot cleaner, comprising:
rotating an infrared ray receiving unit of a rotating plate mounted at a main body of a robot cleaner when the robot cleaner is in a charge mode;
receiving an infrared signal generated from a power supply unit and detecting a direction of the power supply unit on the basis of the infrared signal received through an infrared ray receiving unit;
moving the robot cleaner along the detected direction;
generating a stop signal when the robot cleaner nears to the power supply unit;
stopping movement of the robot cleaner on the basis of the stop signal; and
docking a power terminal of the robot cleaner and a charge terminal of the power supply unit when the robot cleaner is stopped.

15. The method of claim 14, wherein, in the step of moving the robot cleaner, the robot cleaner is moved along a direction in which the infrared signal is generated.

16. The method of claim 14, wherein, in the step of rotating the infrared ray receiving unit, the rotation angle of the infrared ray receiving unit is varied according to the number of infrared ray receiving units installed at the rotating plate.

* * * * *